(12) United States Patent
Mamiya (10) Patent No.: US 8,031,221 B2
(45) Date of Patent: Oct. 4, 2011

(54) IMAGE FORMING APPARATUS

(75) Inventor: Toshiharu Mamiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 937 days.

(21) Appl. No.: 11/972,867

(22) Filed: Jan. 11, 2008

(65) Prior Publication Data

US 2008/0170276 A1   Jul. 17, 2008

(30) Foreign Application Priority Data

Jan. 17, 2007   (JP) ................................ 2007-007666

(51) Int. Cl.
*B41J 2/435* (2006.01)
(52) U.S. Cl. ...................................... 347/263
(58) Field of Classification Search .................... 347/263
See application file for complete search history.

(56) References Cited

U.S. PATENT DOCUMENTS

| | | | |
|---|---|---|---|
| 4,928,134 A * | 5/1990 | Hasegawa et al. | 347/220 |
| 5,552,873 A * | 9/1996 | Hirao et al. | 399/315 |
| 6,397,925 B1 * | 6/2002 | Saito et al. | 164/504 |
| 6,556,314 B1 * | 4/2003 | Shiraishi et al. | 358/471 |
| 2001/0052927 A1 * | 12/2001 | Takase et al. | 347/257 |
| 2005/0270354 A1 * | 12/2005 | Taguchi et al. | 347/104 |
| 2008/0225349 A1 * | 9/2008 | Watanabe | 358/481 |

FOREIGN PATENT DOCUMENTS

JP   11-326808 A   11/1999

* cited by examiner

*Primary Examiner* — Stephen Meier
*Assistant Examiner* — Sarah Al Hashimi
(74) *Attorney, Agent, or Firm* — Fitzpatrick, Cella, Harper & Scinto (57) ABSTRACT

In an image forming apparatus including a main assembly and a scanning optical apparatus which is inserted into the main assembly of the image forming apparatus in a substantially horizontal direction and is mounted to the apparatus main assembly, in order to fix the scanning optical apparatus to the apparatus main assembly in a state in which the scanning optical apparatus is inserted at a predetermined insertion position of the apparatus main assembly, a leaf spring member for urging an end of the scanning optical apparatus with respect to an insertion direction of the scanning optical apparatus is provided on the main assembly of the image forming apparatus or the scanning optical apparatus and a cushioning member press-contacting the leaf spring member between the main assembly of the image forming apparatus and the scanning optical apparatus is provided.

6 Claims, 13 Drawing Sheets

IMAGE FORMING APPARATUS

FIELD OF THE INVENTION AND RELATED ART

The present invention relates to an image forming apparatus including a scanning optical apparatus (scanner) for polarizing laser light from a laser unit and forming an image of the polarized light on a photosensitive member.

The scanning optical apparatus is used as a writing system for an image forming apparatus such as a printer, a digital copying machine, a facsimile machine, or the like. As an optical scanning method, not only a conventional single beam scanning method but also a multi-beam scanning method for optically scanning the same scanning surface with a plurality of light spots at the same time are employed.

A photosensitive medium (photosensitive member) having the scanning surface is also not limited to a single photosensitive member but may also be a plurality of photosensitive members arranged along a path of a toner image transfer medium. As a result, a tandem-type image forming apparatus for forming a superposed image by transferring toner images formed on the plurality of photosensitive members onto a common recording sheet is realized as a color image forming apparatus or the like. A scanning line as a moving locus of a light spot on the scanning surface is ideally arranged in a sub-scanning direction with regular intervals. However, the sub-scanning interval is periodically changed by the influence of vibration of optical paths used for the scanning optical apparatus, the photosensitive member, a developing means, and the like (pitch non-uniformity).

When the change in sub-scanning interval is slight, there is substantially of no practical problem but when the change exceeds a certain level and density non-uniformity due to sparse and dense of the sub-scanning interval is visually confirmed, an image quality is lowered.

For this reason, various methods for suppressing vibration of the optical parts, particularly a folding (reflecting) mirror have been proposed. For example, Japanese Laid-Open Patent Application No. Hei 11-326808 discloses a constitution in which intermediate holding portions are provided in addition to both end holding portions for holding reflecting planes at both ends of a reflecting mirror in order to reduce pitch non-uniformity resulting from vibration of the reflecting mirror generated by rotation of a polygonal mirror and at the intermediate holding portions, one side surface of the mirror with respect to a short side direction is supported by press-contact thereof against an elastic member. The other side surface is pressed with a leaf spring. By this constitution, a frequency and amplitude of the mirror vibration are improved.

However, in order to reduce the pitch non-uniformity, it is necessary to suppress not only the vibration of the optical parts such as the mirror but also vibration of the entire scanning optical apparatus. Particularly, in recent years, when the scanning optical apparatus used in the tandem-type color image forming apparatus is fixed with screws, an optical casing is deformed to cause a difference in shape between a plurality of scanning line on a scanning surface, so that image quality deterioration such as color misregistration can occur. For this reason, in addition to the fixation with the screws, fixation with springs comes into widespread adoption.

However, in the case where the scanning optical apparatus is fixed to a main assembly of the image forming apparatus with springs, the scanning optical apparatus is liable to be vibrated due to external vibration.

Here, the main assembly of the image forming apparatus means an apparatus structural portion which a portion constituted by excluding the scanning optical apparatus from the image forming apparatus, including the scanning optical apparatus, such as a printer, a digital copying machine or a facsimile machine (hereinafter, referred to as an "apparatus main assembly").

FIGS. 12(a) to 12(c) are schematic views for illustrating an embodiment in which a scanning optical apparatus is (spring-)fixed to an apparatus main assembly with screws.

In FIG. 12(a), a reference numeral 1 represents a rotation drum-type electrophotographic photosensitive member as a photosensitive medium of the apparatus main assembly. Around the photosensitive member 1, known process means including a charging device, a developing device, a transfer device, a cleaning device, a discharging device and the like are disposed although they are not shown in FIG. 12(a). A reference numeral 2 represents a scanning optical apparatus as an information writing means with respect to the photosensitive member 1. The scanning optical apparatus 2 is positioned by a positioning pin 8 and a positioning hole 9 with respect to a first stay (apparatus frame) 3 and a second stay (apparatus frame) 4 provided substantially horizontally above the photosensitive member 1 at the apparatus main assembly side and are press-fixed to the stays 3 and 4 by springs 12. In an optical casing 5 of the scanning optical apparatus 2, an unshown optical system including a laser unit, a polygonal mirror, a lens, and the like is accommodated. The scanning optical apparatus 2 polarizes laser light modulated corresponding to electrical digital image information inputted from an unshown control portion. The polarized laser light is emitted downwardly through a scanning light emission opening provided at a lower surface of the optical casing 5 and a corresponding scanning light emission opening 6 provided at a surface of the second stay 4, thus being formed as an image on the photosensitive member 1. A reference symbol L represents the scanning light (laser light emitted from the scanning optical apparatus 2 to the photosensitive member 1. By subjecting the electrically charged surface of the rotating photosensitive member 1 to laser scanning exposure by the scanning optical apparatus 2, an electrostatic latent image corresponding to a scanning exposure pattern is formed on the surface of the photosensitive member 1.

At lower-right side of the optical casing 5, a mounting leg 7 is downwardly provided. To the mounting leg 7, the positioning pin 8 is leftwardly provided and fixed. To the first stay 3, the positioning hole 9 engageable with the positioning pin 8 is provided. At an upper left end portion of the optical casing 5, a projected portion 10 is provided. At an upper surface of the projected portion 10, a leaf spring member 11 for urging the projected portion 10 toward the stay 4 in a direction substantially perpendicular to the stay 4 to press-fix the projected portion 10 to the stay 4 (hereinafter referred to as a "fixing spring 11") is fixedly secured. The fixing spring 11 has a substantially U-shape cross section and is fixed to an upper surface of the projected portion 10 at one of opposing portions constituting the U-shape with a bent portion of the U-shape at a left side. To the second stay 4, a hole-like mounting portion 12 into which the projected portion 10 and the fixing spring 11 are inserted against elasticity of the fixing spring 11.

The mounting of the scanning optical apparatus 2 to the apparatus main assembly is performed in the following manner.

As shown in FIG. 12(b), on the first and second stays 3 and 4, the scanning optical apparatus 2 is mounted so that the positioning pin 8 is located corresponding to the positioning hole 9 of the first stay 3 and so that the projected portion 10 and the fixing spring 11 are located corresponding to the hole-like mounting portion 12 of the second stay 4. Then, the scanning optical apparatus 2 is moved and inserted substantially horizontally by being slid across the stays 3 and 4 from the right side to the left side on the figure. A reference symbol A represents an insertion direction of the scanning optical apparatus 2 into the apparatus main assembly and is a substantially horizontal direction from the right side to the left side on the figure. At the right side of the optical casing 5, the scanning optical apparatus 2 is vertically fixed by engagement of the positioning pin 8 of the mounting leg 7 with the positioning hole 9 of the first stay 3. In this case, the optical casing 5 is leftwardly urged by an unshown urging means, so that the scanning optical apparatus is fixed also with respect to the horizontal direction by pressing the mounting leg 7 against the first stay 3. That is, the scanning optical apparatus 2 is inserted into the apparatus main assembly in a predetermined direction to be placed in a positioned state. At the left side of the optical casing 5, the projected portion 10 and the fixing spring 11 are inserted into the hole-like mounting portion 12 of the second stay 4 against the elasticity of the fixing spring 11. As a result, the fixing spring 11 is compressed and deformed in the mounting portion 12. By a deformation reaction force, the projected portion of the scanning optical apparatus 2 as the end portion with respect to the insertion direction of the scanning optical apparatus 2 is urged in a substantially vertical direction to be pressed against the second stay 4, so that the left-side portion of the optical casing is press-fixed to the second stay 4. FIG. 12(a) shows a state in which the scanning optical apparatus 2 is injected into the apparatus main assembly in the predetermined direction to be mounted to the first and second stays 3 and 4 with springs.

However, in such a spring fixation constitution, the scanning optical apparatus 2 oscillates by vibration of the apparatus main assembly with the positioning pin 8 of the mounting leg 7 at its right side as a fulcrum, so that scanning light L emitted from the scanning optical apparatus 2 is caused to fluctuate on a surface of the photosensitive member 1 to be scanned to periodically change a sub-scanning interval, thus leading to pitch non-uniformity.

Generally, vibration of a spring mass system is expressed by an equivalent circuit including a mass m, a spring constant k and a viscous damping c, so that vibration B of the projected portion 10 as a left-side spring fixing portion of the scanning optical apparatus 2 shown in FIG. 12(a) is represented by an equivalent circuit shown in FIG. 12(c). This vibration system does not include the viscous damping c (or includes a very small viscous damping c), so that the system is liable to be vibrated by an external force.

By using a rubber (material) 13 as a cushioning member in place of the fixing spring 11 as shown in FIG. 13(a), it is possible to suppress vibration. The rubber 13 exhibits elasticity and damping, so that vibration B of the projected portion as the left-side fixing portion of the scanning optical apparatus 2 shown in FIG. 13(a) is represented by an equivalent circuit shown in FIG. 13(c). In this vibration system, when an amount of damping is set to be large, vibration due to the external force can be absorbed. However, in order to achieve a cushioning effect by increasing the amount of damping, it is necessary to use the rubber 13 in a state in which the rubber 13 is liable to be deformed, i.e., in a state in which an initial deformation of the rubber 13 is small. In this state, an amount of rubber deformation is small and therefore a generated force is also small, so that fixation of the scanning optical apparatus 2 to the apparatus main assembly is unstable. It can be considered that a hardness of the rubber is increased in order to generate a large force even in a small amount of the rubber deformation. However, in the case where the hardness is increased, an elastic force with respect to the rubber deformation amount is large, so that a fluctuation in force is increased by variation of a rubber dimension. A force for fixing the scanning optical apparatus 2 to the apparatus main assembly is excessively increased or is not generated.

Figure 12:
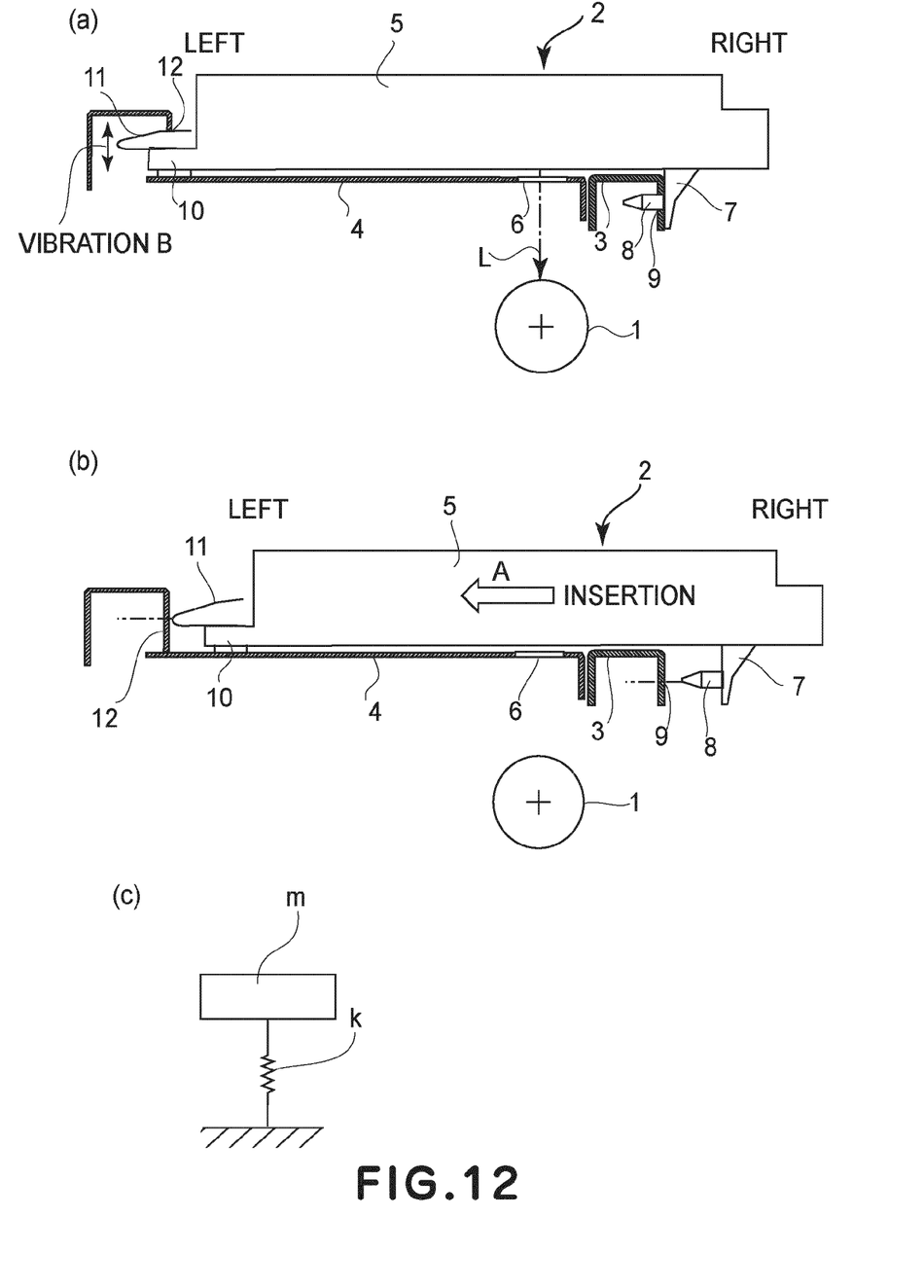
Figure 13:
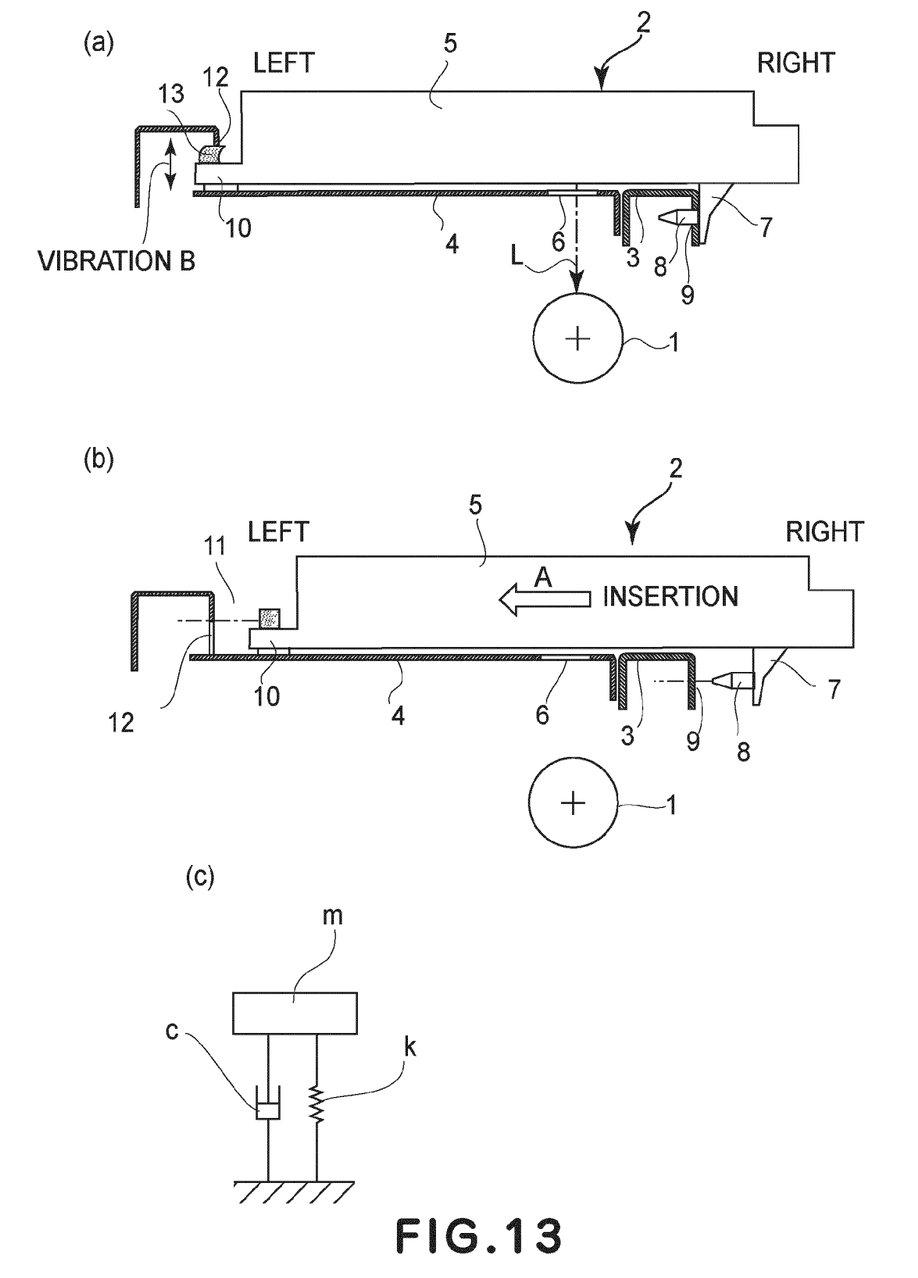
Figure 14:
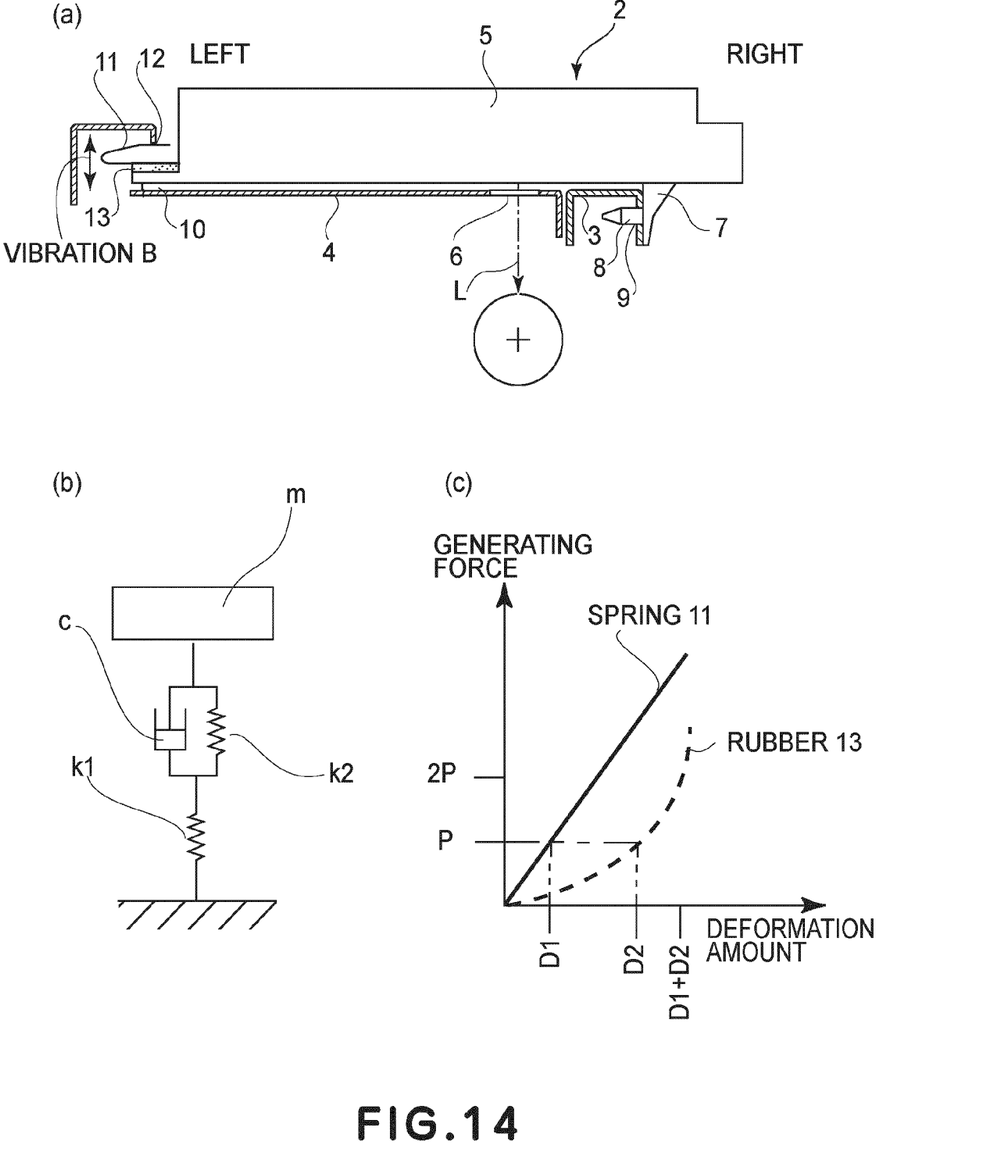

As shown in FIG. 14(a), in the case where the fixing spring 11 shown in FIG. 12 and the rubber 13 as the cushioning member shown in FIG. 13 are vertically superposed, the resultant structure is an equivalent circuit shown in FIG. 14(b). In this case, as shown in a graph of FIG. 14(c), the fixing spring 11 and the rubber 13 are deformed so as to generate an identical force P. In FIG. 14(c), a solid line represents a relationship between an amount of deformation and a generating force of the fixing spring 11 and a broken line represents that of the rubber 13. At the same generating force P, the deformation amount of the fixing spring 11 is D1 but that of the (soft) rubber 13 is D2, so that the rubber 13 is largely deformed. In this case, the rubber 13 cannot be used a state of less deformation for achieving a cushioning effect by increasing the damping.

As described above, in such a constitution that the cushioning member and the spring member are simultaneously deformed, each of adjustment of a fixing force of the scanning optical apparatus 2 to the apparatus main assembly by deformation of the spring member and the cushioning member and adjustment of a cushioning force for absorbing vibration by deformation of the rubber is not readily performed. For this reason, it is difficult to reliably fix the scanning optical apparatus to the apparatus main assembly while using the rubber in the state of less deformation. Even in a constitution in which the cushioning member and the spring member are simultaneously deformed, it can also be considered that the fixing force and the cushioning effect are compatibly realized with a slight amount of deformation by increasing a spring constant of the spring member. However, in this constitution, a fluctuation of force is increased by variation of a rubber dimension, so that a problem similar to that in the case of increasing the rubber hardness is caused to occur when the rubber member is fixed alone as shown in FIG. 13.

SUMMARY OF THE INVENTION

A principal object of the present invention is to provide an image forming apparatus capable of independently controlling deformation of a cushioning member and a spring member when a scanning optical apparatus is fixed to an apparatus main assembly by using the cushioning member and the spring member.

Further, another object of the present invention is to provide an image forming apparatus capable of reliably fixing a scanning optical apparatus to an apparatus main assembly in a state of less deformation of a cushioning member when the scanning optical apparatus is fixed to the apparatus main assembly by using the cushioning member.

According to an aspect of the present invention, there is provided an image forming apparatus comprising:

a main assembly;

a scanning optical apparatus;

a leaf spring member, provided on the main assembly of the image forming apparatus or the scanning optical apparatus, for urging the scanning optical apparatus when the scanning optical apparatus is set at a setting position of the main assembly of the image forming apparatus; and a cushioning member press-contacting the leaf spring member between the main assembly of said image forming apparatus and the scanning optical apparatus after the leaf spring member is deformed in a predetermined amount by setting the scanning optical apparatus at the setting position.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 12(a) to 12(c), FIGS. 13(a) to 13(c), and FIGS. 14(a) to 14(c) show conventional embodiments, respectively.

DETAILED DESCRIPTION OF THE PREFERRED EMBODIMENTS

Hereinbelow, embodiments of the present invention will be described with reference to the drawings.

Embodiment 1

Constitutional members or portions in common with those for the apparatuses shown in FIGS. 12 to 15 are represented by identical reference numerals or symbols and redundant description thereof is omitted.

Figure 1:
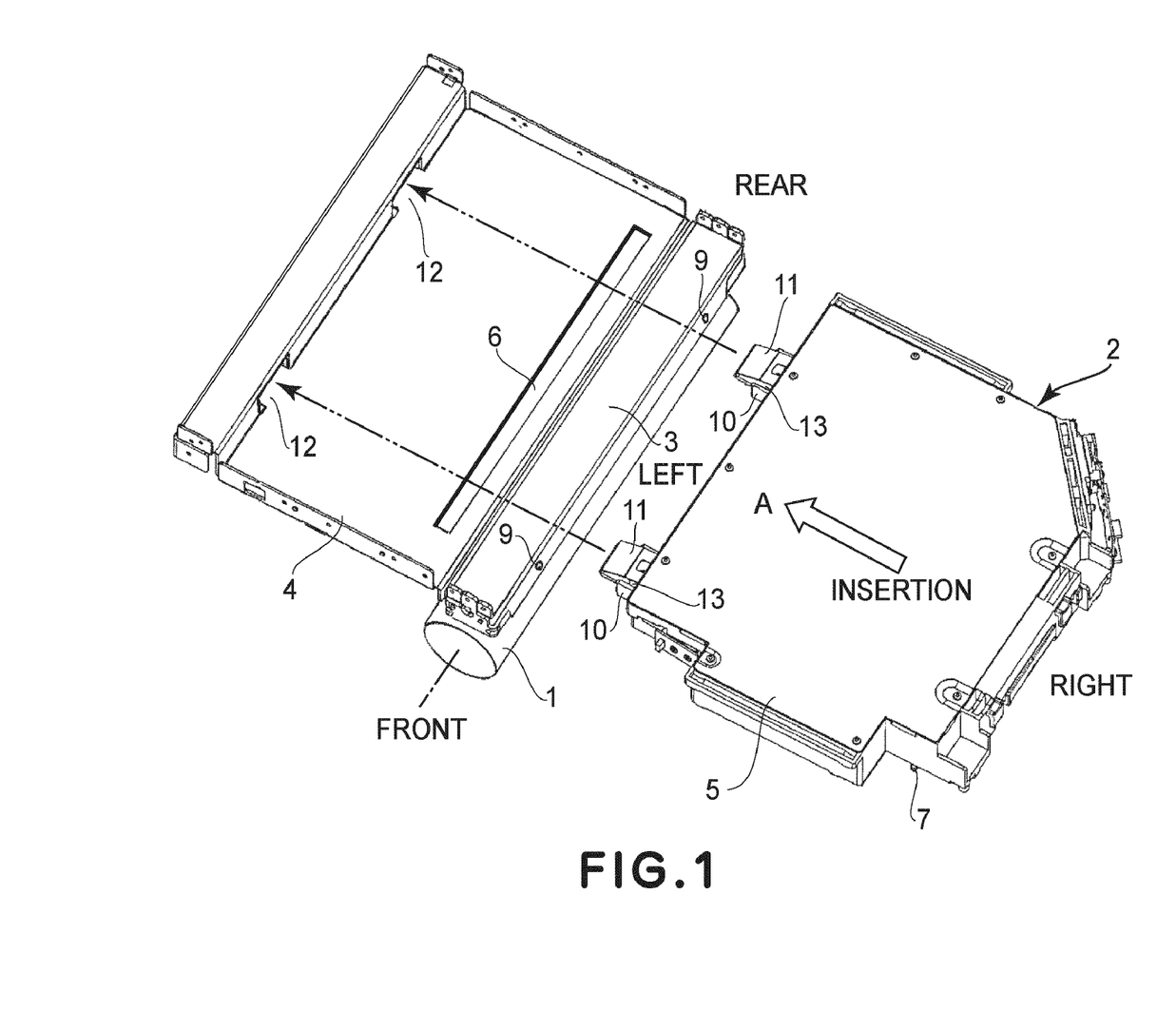
FIG. 1 is a perspective view of an upper-side outer appearance of first and second stays and a scanning optical apparatus in Embodiment 1.
Figure 2:
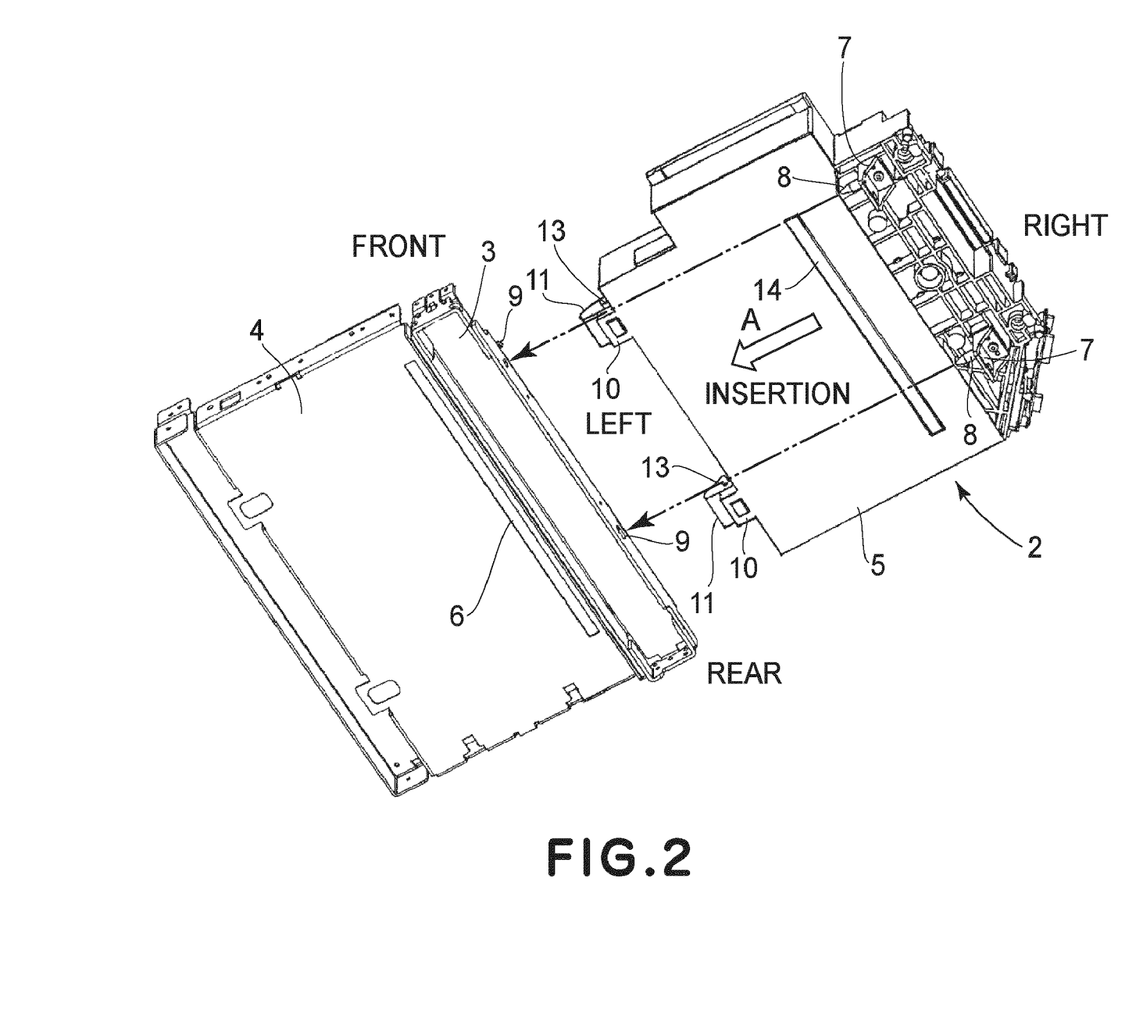
FIG. 2 is a perspective view of a lower-side outer appearance of the first and second stays and the scanning optical apparatus.
Figure 3:
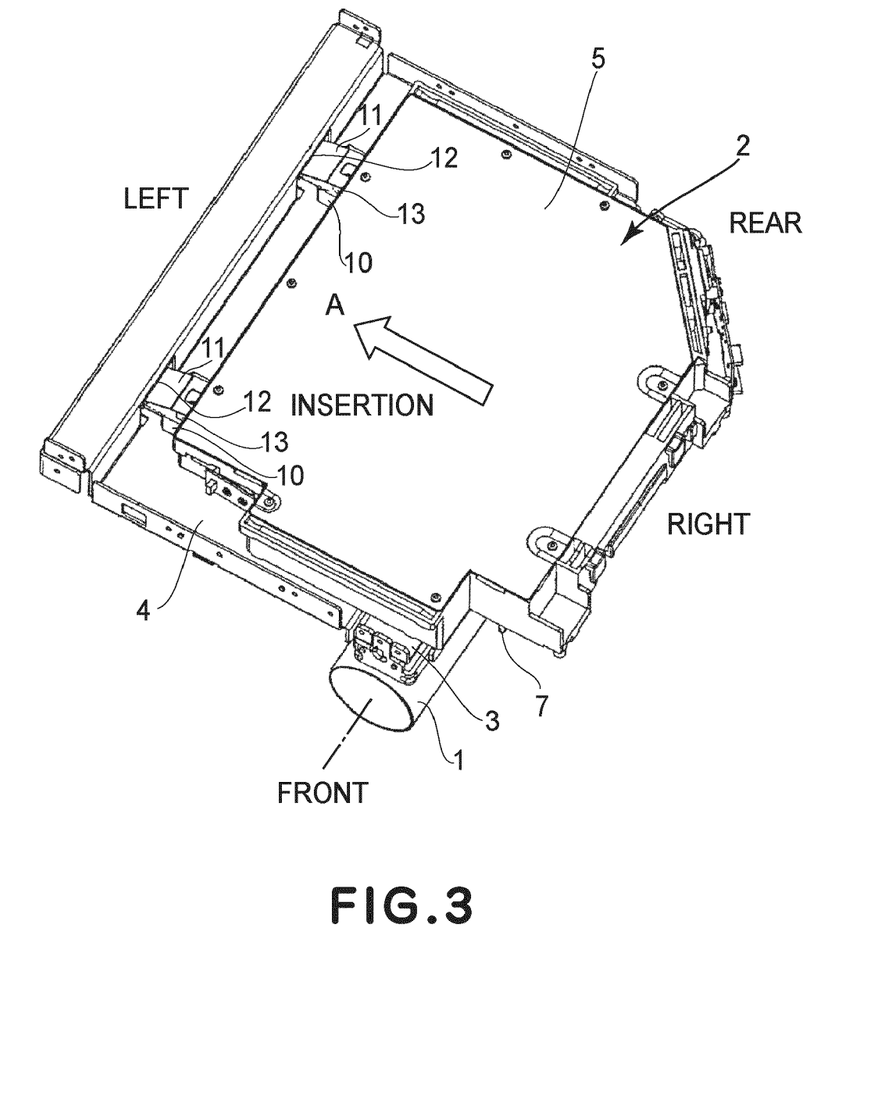
FIG. 3 is a perspective view of an upper-side outer appearance of the scanning optical apparatus during insertion into the first and second stays.
Figure 4:
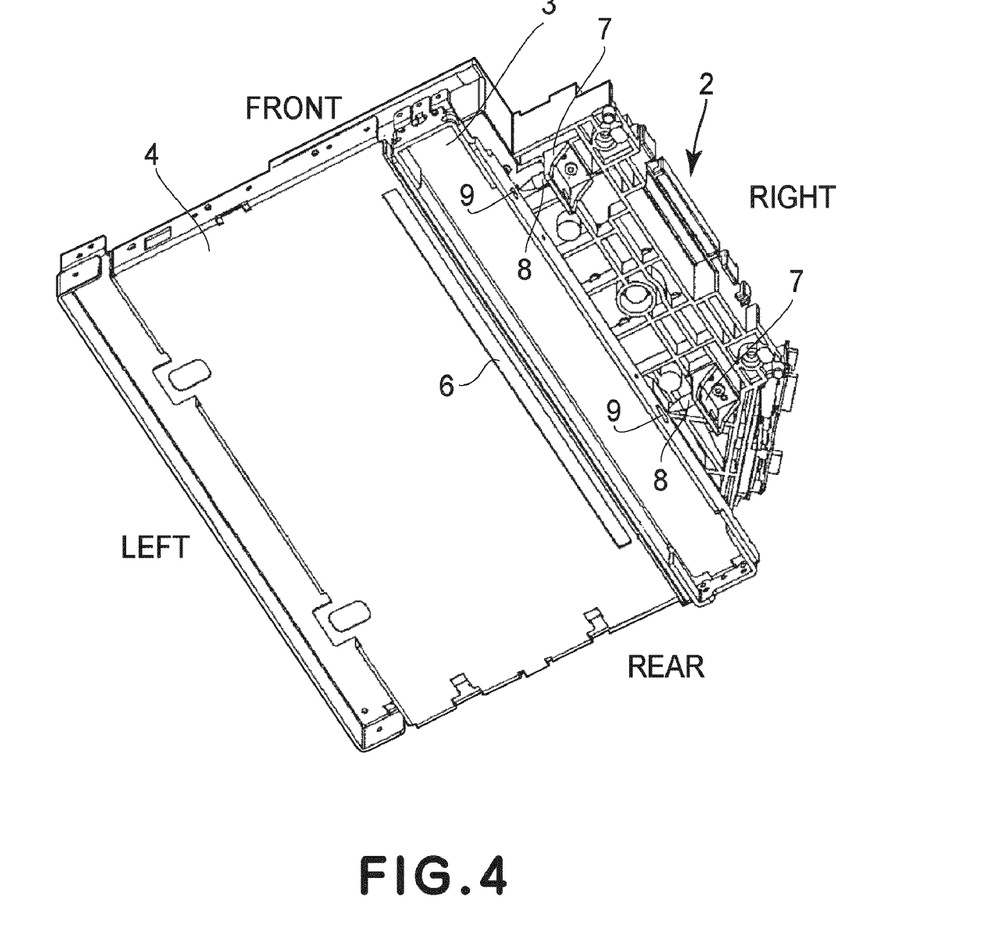
FIG. 4 is a perspective view of a lower-side outer appearance of the scanning optical apparatus during insertion into the first and second stays.
Figure 5:
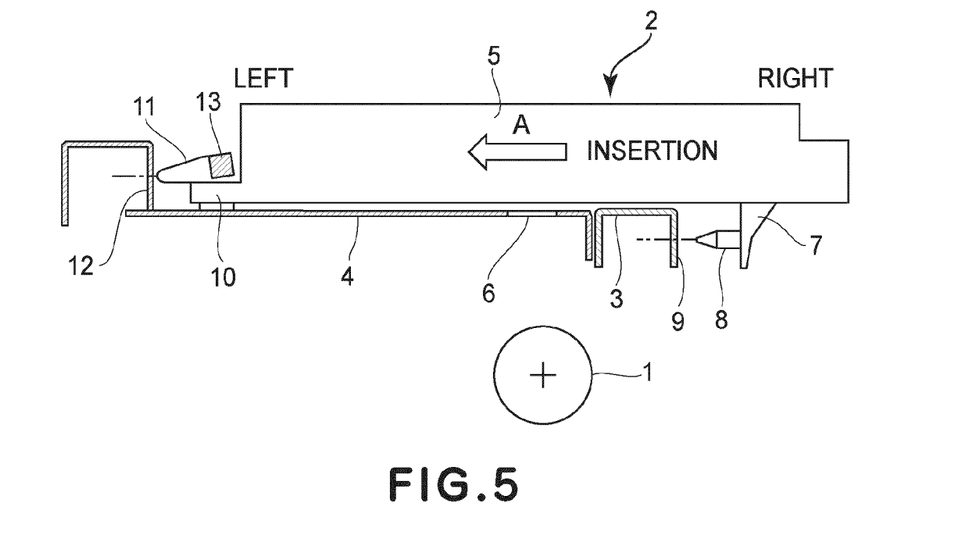
FIGS. 5 and 6 are views showing an unmounted state and a mounted state of the scanning optical apparatus, respectively.
Figure 6:
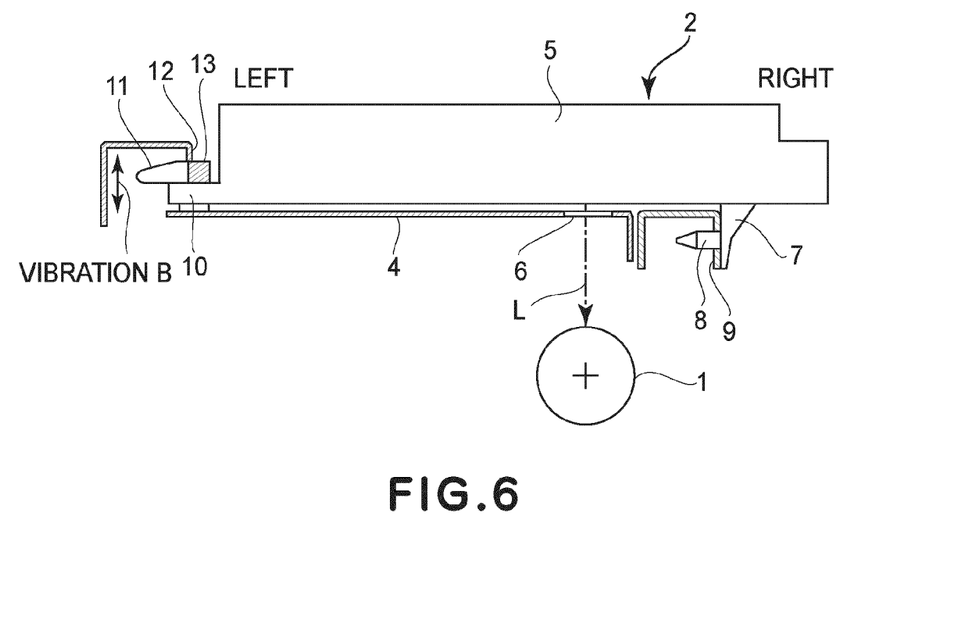

FIG. 1 is a perspective view of an upper-side outer appearance of first and second stays 3 and 4 and a scanning optical apparatus 2, and FIG. 2 is a perspective view of a lower-side outer appearance of the first and second stays 3 and 4 and the scanning optical apparatus 2. FIG. 3 is a perspective view of an upper-side outer appearance of the scanning optical apparatus 2 during insertion into the first and second stays 3 and 4, and FIG. 4 is a perspective view of a lower-side outer appearance of the scanning optical apparatus 2 during insertion into the first and second stays 3 and 4. FIGS. 5 and 6 are views showing an unmounted state and a mounted state of the scanning optical apparatus 2, respectively.

At lower-right side of the optical casing 5, a pair of mounting legs 7 is downwardly provided at front and rear sides. To each of the mounting legs 7, a positioning pin 8 is leftwardly provided and fixed. To the first stay 3, a pair of positioning holes 9 engageable with the pair of positioning pins 8 is provided at front and rear sides. At an upper left end portion of the optical casing 5, a pair of projected portions 10 is provided at front and rear sides. At an upper surface of each of the projected portions 10, a fixing spring 11 for urging the projected portion 10 toward the stay 4 in a direction substantially perpendicular to the stay 4 to press-fix the projected portion 10 to the stay 4 is fixedly secured. The fixing spring 11 is a leaf spring member having a substantially U-shape cross section and is fixed to an upper surface of the projected portion 10 at one of opposing portions constituting the U-shape with a bent portion of the U-shape at a left side. At one of two opposing inner surfaces of each of the U-shaped fixing spring 11, a rubber 13 as a cushioning member is attached as shown in FIG. 5. To the second stay 4, a pair of hole-like mounting portion 12 into which the pair of projected portions 10 and the fixing springs 11 are inserted against elasticity of the fixing springs 11.

As shown in FIGS. 3 to 5, on the first and second stays 3 and 4, the scanning optical apparatus 2 is mounted so that the positioning pins 8 is located corresponding to the positioning hole 9 of the first stay 3 and so that the projected portion 10 and the fixing spring 11 are located corresponding to the hole-like mounting portion 12 of the second stay 4. Then, the scanning optical apparatus 2 is moved and inserted substantially horizontally by being slid across the stays 3 and 4 from the right side to the left side on the figure. At the right side of the optical casing 5, as shown in FIG. 6, the scanning optical apparatus 2 is vertically fixed by engagement of the positioning pin 8 of the mounting leg 7 with the positioning hole 9 of the first stay 3. In this case, the optical casing 5 is leftwardly urged by an unshown urging means, so that the scanning optical apparatus is fixed also with respect to the horizontal direction by pressing the mounting leg 7 against the first stay 3. That is, the scanning optical apparatus 2 is inserted into the apparatus main assembly in a predetermined direction to be placed in a positioned state. At the left side of the optical casing 5, the projected portion 10 and the fixing spring 11 are inserted into the hole-like mounting portion 12 of the second stay 4 against the elasticity of the fixing spring 11 and the rubber 13 attached to the inside of the U-shaped fixing spring 11. In the mounted state of the scanning optical apparatus 2 shown in FIG. 6, the fixing spring 11 and the rubber 13 are deformed in the mounting portion 12. By a deformation reaction force, the projected portion of the scanning optical apparatus 2 as the end portion with respect to the insertion direction of the scanning optical apparatus 2 is urged in a substantially vertical direction to be pressed against the second stay 4, so that the left-side portion of the optical casing is press-fixed to the second stay 4. In this way, the scanning optical apparatus 2 is injected into the apparatus main assembly in the predetermined direction to be mounted to the first and second stays 3 and 4 with springs. More specifically, in the state in which the scanning optical apparatus 2 is inserted into the apparatus main assembly at the predetermined insertion position, the fixing spring 11 urges the projected portion 10 as the end portion of the scanning optical apparatus 2 with respect to the substantially vertical direction. Further, the rubber 13 as the cushioning member is pressed against the apparatus main assembly and the scanning optical apparatus 2 through the fixing spring 11. As a result, the scanning optical apparatus 2 is fixed to the apparatus main assembly with springs.

Incidentally, as shown in FIG. 2, a scanning light emission opening 14 is provided to a lower surface of the optical casing 5 of the scanning optical apparatus 2. The opening 14 is located corresponding to a scanning light emission opening provided to the second stay 4 in the state in which the scanning optical apparatus 2 is inserted into the apparatus main assembly at the predetermined position.

The rubber 13 as the cushioning member provided to the inside of the fixing spring 11 as the U-shaped leaf spring member is not deformed in the unmounted state of the scanning optical apparatus 2 shown in FIG. 5. When the scanning optical apparatus 2 is leftwardly pressed into the apparatus main assembly, the fixing spring 11 is started to be deformed by being engaged with and pressed against the mounting portion 12 of the second stay 4. Further, the rubber 13 located inside the fixing spring 11 is pressed and deformed by the two inner opposing surfaces of the fixing spring 11.

Figure 7:
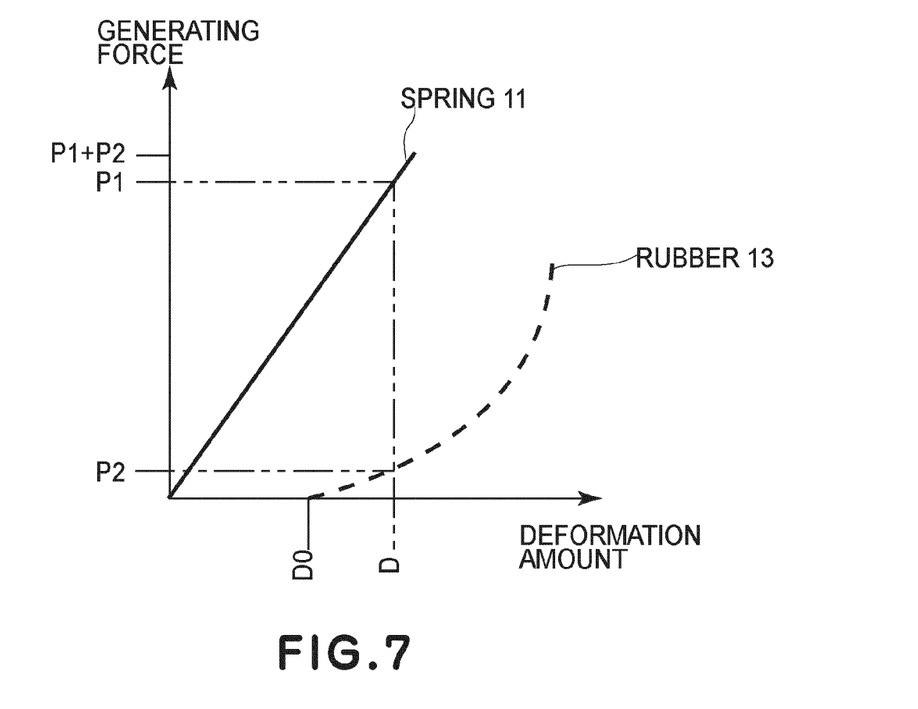
FIG. 7 is a graph showing a relationship between a deformation amount and a generating force (load) with respect to a fixing spring (leaf spring member) and a rubber (cushioning member).

In this case, a relationship between a deformation amount and a generating force with respect to the fixing spring 11 and the rubber 13 is shown in a graph of FIG. 7. In the graph of FIG. 7, a solid line represents the relationship for the fixing spring 11 and a broken line represents the relationship for the rubber 13. When the fixing spring 11 is deformed in an amount D0, the rubber 13 is started to be deformed by being pinched between the two opposing surfaces of the fixing spring 11. In the mounted state of the scanning optical apparatus 2 shown in FIG. 6, the deformation amount of the fixing spring 11 is D but the deformation amount of the rubber 13 is D−D0. Generating forces of the fixing spring 11 and the rubber 13 are P1 and P2, respectively, and a force for pressing the projected portion 10 as a spring fixing portion of the optical casing 5 against the second stay 4 as the apparatus main assembly-side member is P1+P2. In this case, D>(D−D0) and P1>>P2 are satisfied. For this reason, the generating force of the rubber 13 is small, so that a fluctuation thereof is negligible. The force for fixing the scanning optical apparatus 2 is almost generated by the fixing spring 11, so that it is possible to stably fix the scanning optical apparatus 2 with springs by controlling the deformation amount D of the fixing spring 11.

Figure 8:
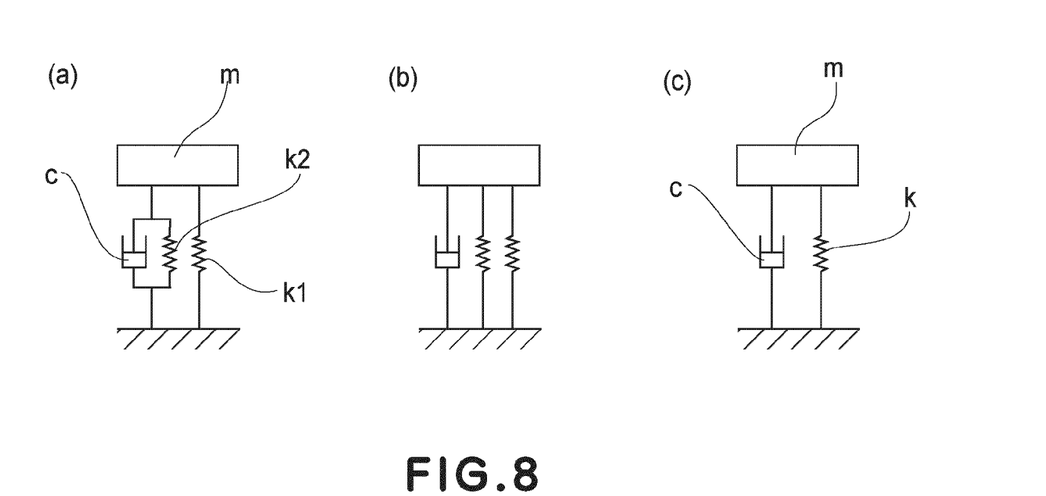
FIGS. 8(a), 8(b) and 8(c) are equivalent circuits of vibration systems.

This vibration system is expressed by an equivalent circuit shown in FIG. 8(a). A spring constant k1 represents the fixing spring 11, and a viscous damping c and a spring constant k2 represent the rubber 13. The circuit shown in FIG. 8(a) is equivalent to a circuit shown in FIG. 8(b) and the two spring constants k1 and k2 can be expressed by one spring constant k (=k1+K2), so that the circuit shown in FIG. 8(a) can be expressed as an equivalent circuit shown in FIG. 8(c). As described above, vibration due to the external force can be absorbed in this vibration system when an amount of the damping is set to be large. In order to achieve the cushioning effect by increasing the damping amount, it is necessary to use the rubber 13 in a deformable state, i.e., a state of less initial deformation. However, the deformation amount of the rubber 13 is smaller than that of the fixing spring 11, so that a sufficient cushioning effect can be obtained. Further, it is also possible to set the value of D0 to an arbitrary value depending on a status of use. As described above, in the present invention, the deformation amounts of the cushioning member and the spring member can be independently controlled. Further, in the state of less initial deformation of the cushioning member, it is possible to fix the scanning optical apparatus 2 to the apparatus main assembly with reliably.

Figure 15:
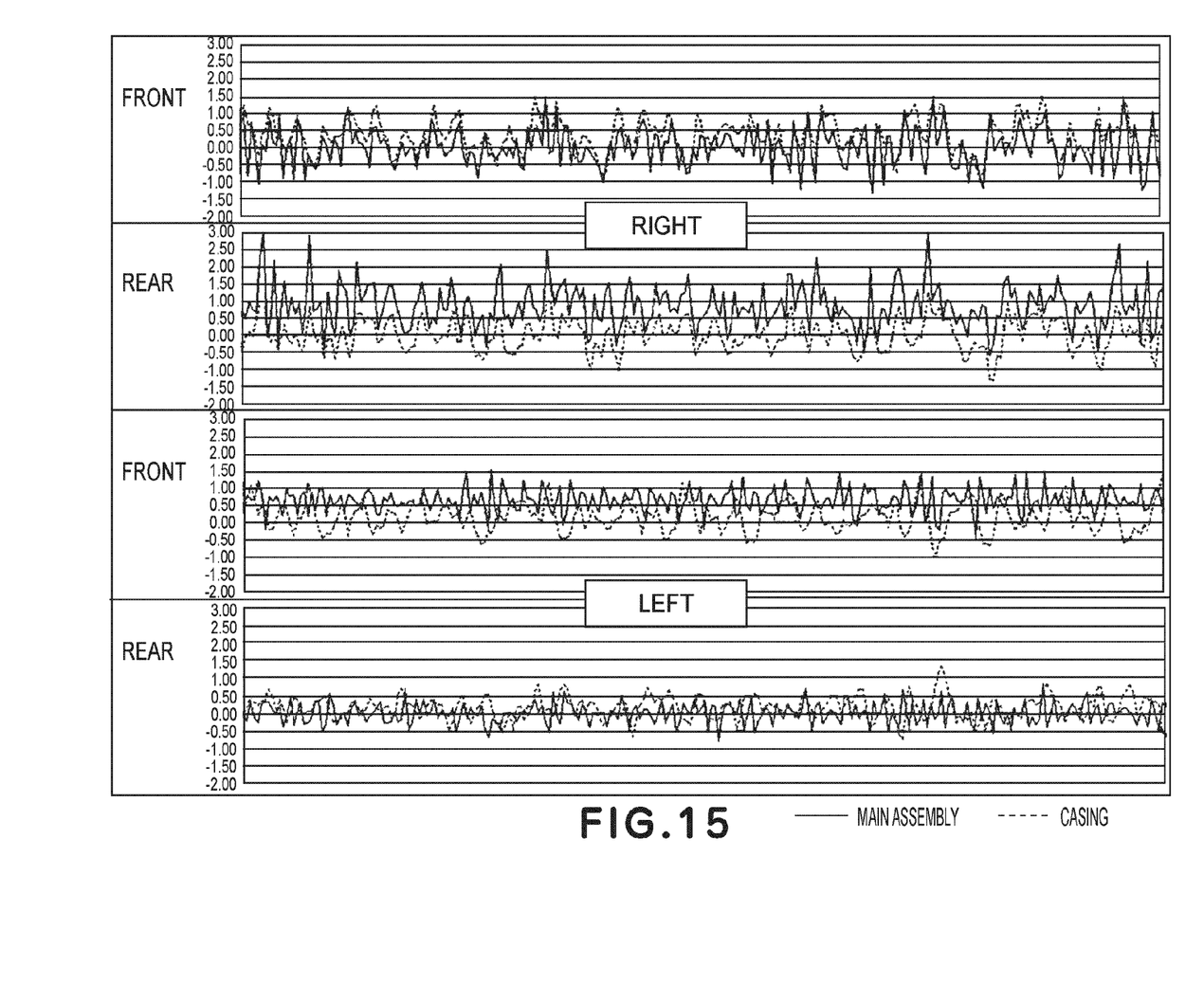
FIG. 15 is a chart showing vibration of an optical casing and stays in the conventional embodiment shown in FIG. 12.

Next, vibration of the scanning optical apparatus 2 (optical casing 5) will be described. FIG. 15 is a diagram including graphs (charts) obtained by measuring a degree of vibration of the optical casing 5 of the scanning optical apparatus 2 fixed with springs by the conventional method, and a degree of vibration of the first stay 3 or the second stay 4 of the apparatus main assembly. Upper two graphs of FIG. 15 show the vibration degrees of the optical casing 5 and the first stay 3 in the neighborhood of the mounting legs 7 at front and rear sides, respectively, of a right-side portion of the optical casing 5. Lower two graphs of FIG. 15 show the vibration degrees of the optical casing portion and the second stay portion in the neighborhood of the projected portions 10 to which the fixing springs 11 are fixed at front and rear sides, respectively, of a left-side portion of the optical casing 5. In these graphs, solid lines represent the vibration degrees of the stay 3 or 4 and broken lines represent the vibration degrees of the optical casing portions. With respect to right-side vibration waveforms of the stay and the optical casing, phases of peaks and valleys coincide with each other, so that it is found that the optical casing 5 is moved in synchronism with the stay 3. On the other hand, with respect to left-side waveforms of the stay and the optical casing, phases of peaks and valleys do not coincide with each other, so that it is found that a portion close to the projected portions 10 of the optical casing 5 is moved in asynchronism with the stay 4. This difference in movement between the right-side and left-side portions is the oscillating movement of the mounting legs 7 with the positioning pins 8 as fulcrums in the conventional apparatus, thus causing the fluctuation in sub-scanning interval.

Figure 9:
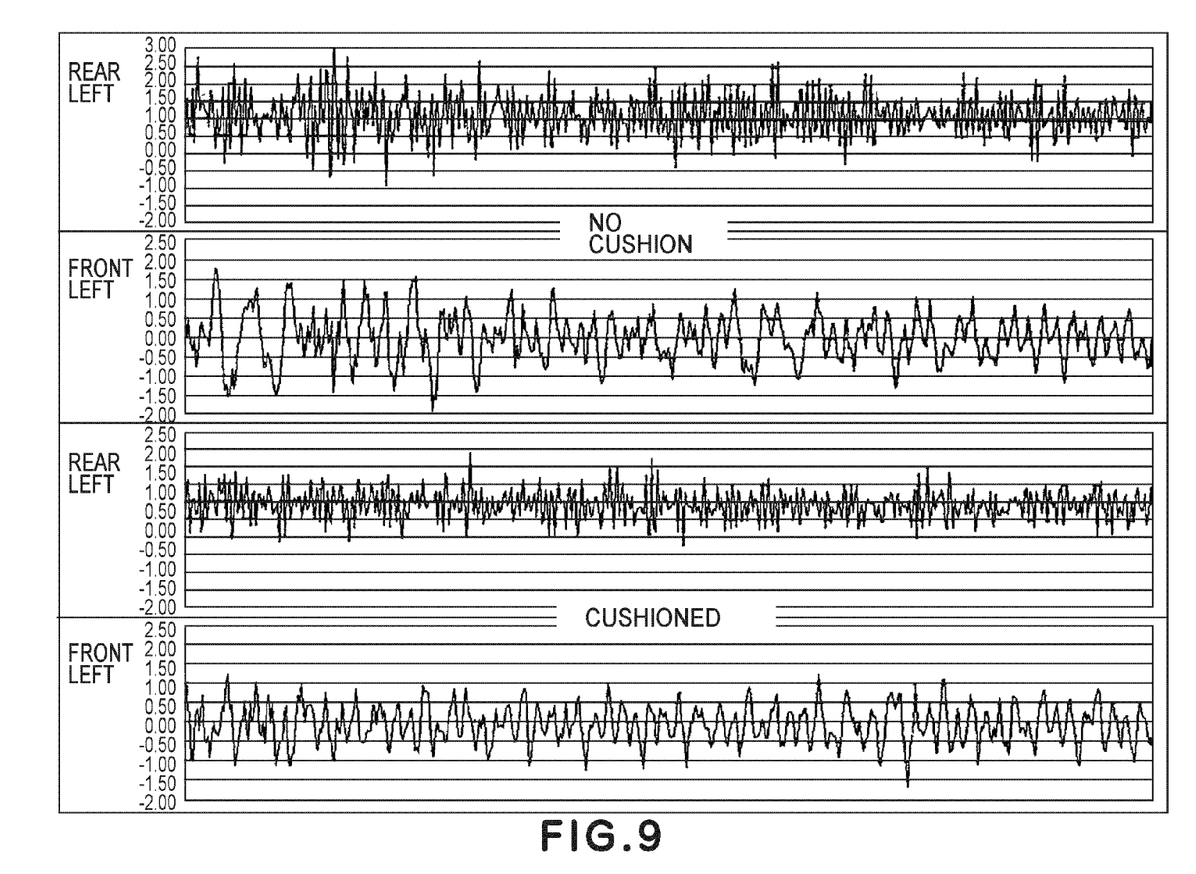
FIG. 9 is a chart showing vibration of an optical casing.

In this embodiment, by attaching the rubber 13 as the cushioning member to one of the two opposing inner surfaces of the fixing spring 11, it is possible to reduce the vibration degree of the optical casing 5 of the scanning optical apparatus 2. FIG. 9 is a diagram including graphs showing degrees of vibration measured at the left-side portion of the optical casing 5. Upper two graphs show the vibration degrees of the optical casing 5, in a state (with no cushioning member) in which the fixing spring 11 is not provided with the rubber 13, at front and rear sides, respectively. Lower two graphs show the vibration degrees of the optical casing 5, in a state (with the cushioning member) in which the fixing spring 11 is provided with the rubber 13, at front and rear sides, respectively. As is understood from comparison between the upper and lower graphs, in the state with the cushioning member, an amplitude of vibration of the optical casing 5 is decreased. Further, with respect to an actually outputted image, pitch non-uniformity is reduced, so that an effect of the cushioning member can be confirmed.

The rubber 13 used for measurement has a hardness of 30-40 degrees and an impact resilience of about 2% but when an effect as the cushioning member is taken into consideration, characteristics of the rubber 13 may desirably include a hardness of 50 degrees or less and an impact resilience of 5% or less. The impact resilience is measured according to a Rupke-type impact resilience test as an impact resilience test for vulcanised rubber and thermoplastic rubber according to JIS K6255. During measurement of the impact resilience, it is desirable that a sample to be measured is sufficiently left standing in a predetermined measuring temperature condition (25° C.) so that the temperature of the sample is the measurement temperature during the measurement.

Embodiment 2

In Embodiment 1, the fixing spring 11 and the rubber 13 are provided at the end portion of the scanning optical apparatus 2 with respect to the insertion direction of the scanning optical apparatus 2 but are, in this embodiment, provided at a portion of the apparatus main assembly close to the end portion of the scanning optical apparatus 2.

Figure 10:
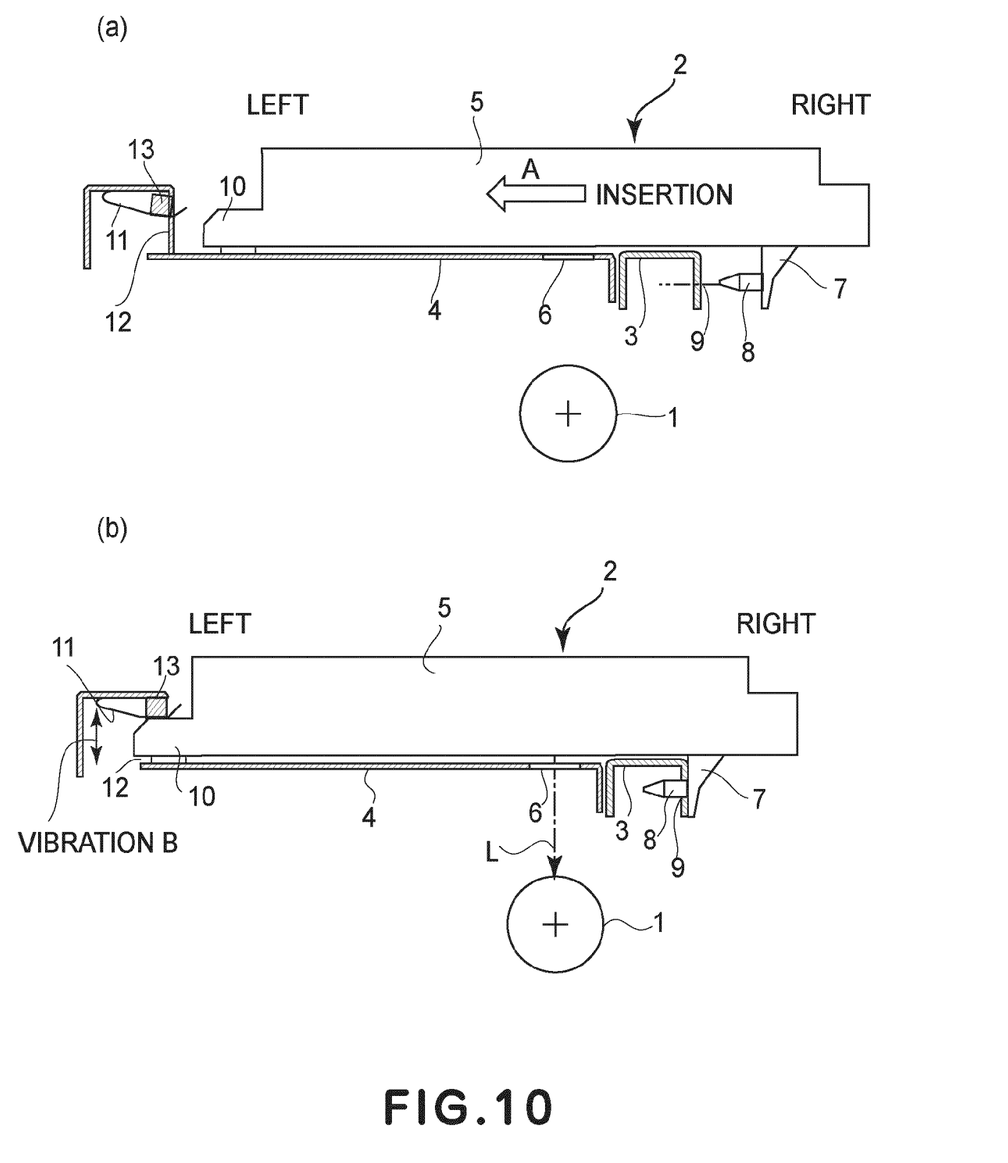
FIGS. 10(a) and 10(b) are views for illustrating Embodiment 2.

FIG. 10(a) shows a state in which the scanning optical apparatus 2 is not mounted to the apparatus main assembly, and FIG. 10(b) shows a state in which the scanning optical apparatus 2 is inserted into the apparatus main assembly to be mounted to the apparatus main assembly.

In this embodiment, the fixing spring 11 is attached to an inner upper portion of a hole-like mounting portion of the second stay 4 as an apparatus main assembly-side member. The fixing spring 11 is a leaf spring member having a substantially U-shape cross section and is fixed to the upper surface of the hole-like mounting portion 12 of the second stay 4 at one of opposing portions constituting the U-shape with a bent portion of the U-shape at a left side. At one of two opposing inner surfaces of each of the U-shaped fixing spring 11, a rubber 13 as a cushioning member is attached as shown in FIG. 5. In the unmounted state of the scanning optical apparatus 2 as shown in FIG. 10(a), the rubber 13 secured to the inside of the fixing spring 11 is not deformed.

When the scanning optical apparatus 2 is substantially horizontally inserted and moved from a right to left direction by being slid on the stays 3 and 4, the projected portion 10 located at the left side of the optical casing 5 enters the hole-like mounting portion 12 of the second stay 4 to be engaged with the fixing spring 11, so that the fixing spring 11 is started to be deformed. When the fixing spring 11 is deformed in a predetermined amount, the rubber 13 is pinched between two opposing surfaces of the substantially U-shaped fixing spring 11, thus being started to be deformed. In the mounted state of the scanning optical apparatus 2 shown in FIG. 10(b), the fixing spring 11 and the rubber 13 are deformed in the mounting portion 12. By a deformation reaction force, the projected portion of the scanning optical apparatus 2 as the end portion with respect to the insertion direction of the scanning optical apparatus 2 is urged in a substantially vertical direction to be pressed against the second stay 4, so that the left-side portion of the optical casing is press-fixed to the second stay 4. In this way, the scanning optical apparatus 2 is injected into the apparatus main assembly in the predetermined direction to be mounted to the first and second stays 3 and 4 with springs.

In this embodiment, similarly as in Embodiment 1, the deformation amount of the rubber 13 is small, so that a sufficient cushioning effect can be achieved. Thus, it is possible to suppress the vibration of the projected portion 10 as a spring fixing portion of the scanning optical apparatus 2.

Embodiment 3

Figure 11:
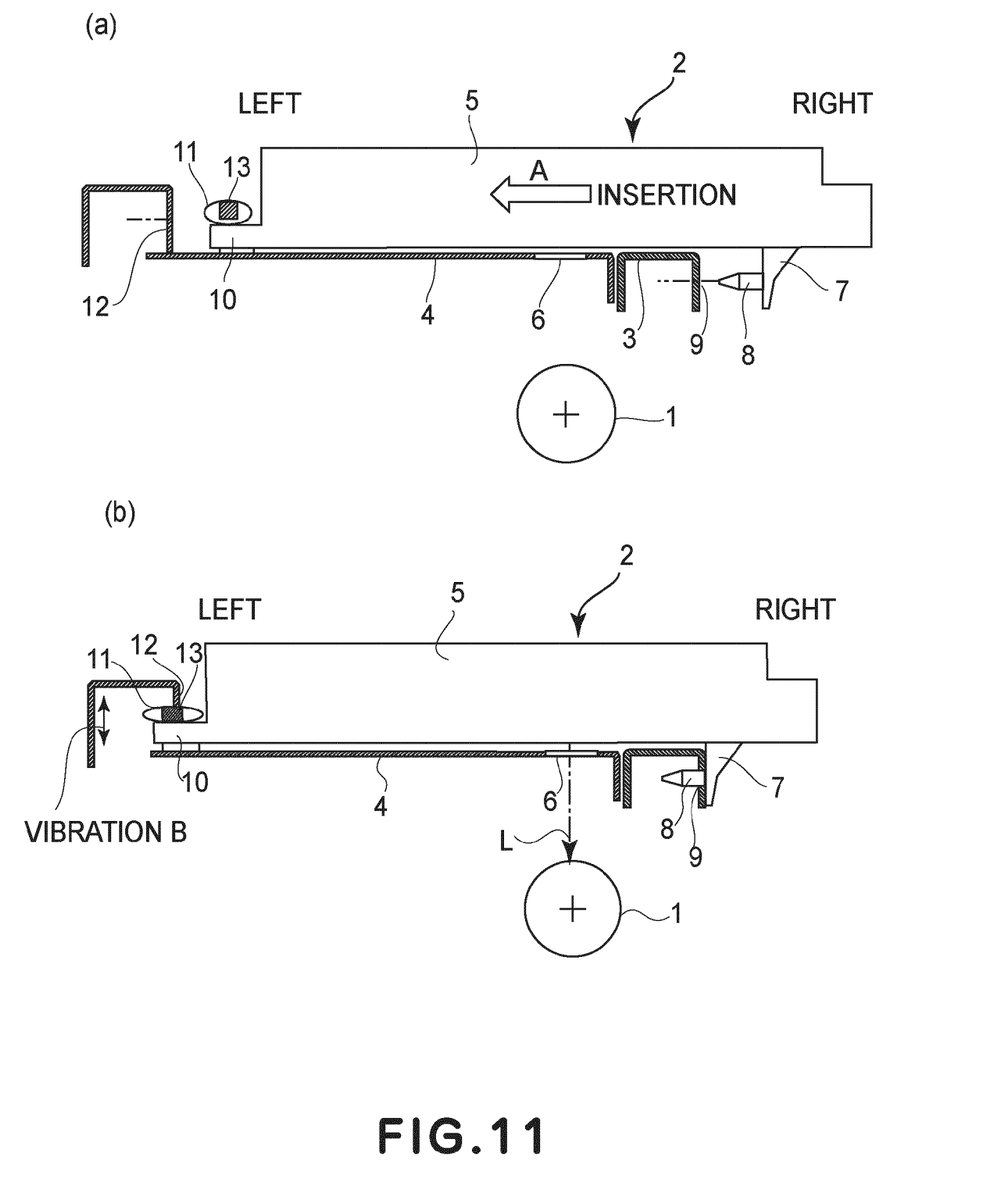
FIGS. 11(a) and 11(b) are views for illustrating Embodiment 3.

As shown in FIGS. 11(a) and 11(b), the leaf spring member 11 is an elliptical or annular member in which the rubber 13 is disposed.

According to the present invention, the cushioning member is appropriately deformed between the image forming apparatus main assembly and the scanning optical apparatus by deformation of the leaf spring member, so that it is possible to suppress vibration of the scanning optical apparatus at a fixing portion by the leaf spring member while keeping a sufficient cushioning effect.

Further, deformation amounts of the leaf spring member and the cushioning member can be separately set, so that control of a fixing force is easy and therefore the scanning optical apparatus can be fixed with reliability.

By the presence of the leaf spring member, during the insertion of the scanning optical apparatus into the image forming apparatus main assembly, the scanning optical apparatus and the image forming apparatus main assembly do not directly contact the cushioning member, so that it is possible to prevent performance degradation due to wearing or scraping of the cushioning member.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 007666/2007 filed Jan. 17, 2007, which is hereby incorporated by reference.

What is claimed is:

1. An image forming apparatus comprising:
   a main assembly;
   a scanning optical apparatus;
   a leaf spring member for engaging said scanning optical apparatus with said main assembly, said leaf spring member being located at a position to be deformed when said scanning optical apparatus and said main assembly are engaged in a setting position; and
   a cushioning member that elastically deforms by being urged by said leaf spring member when said leaf spring member is deformed at the setting position,
   wherein said scanning optical apparatus is externally inserted toward said setting position, and
   wherein said leaf spring member has a substantially U-shaped cross section with respect to an insertion direction of said scanning optical apparatus, and said cushioning member is mounted at one of opposing portions constituting an inner surface of said U-shaped cross section of said leaf spring member.

2. An apparatus according to claim 1, wherein said cushioning member is formed of a material having an impact resilience of 5% or less.

3. An apparatus according to claim 1, wherein said cushioning member is formed of a material having a hardness of 50 degrees or less.

4. An apparatus according to claim 1, wherein said leaf spring member and said cushioning member are mounted to either said scanning optical apparatus or said main assembly.

5. An apparatus according to claim 1, wherein said cushioning member is a rubber member.

6. An apparatus according to claim 1, wherein, when said scanning optical apparatus is inserted and set at said setting position, said leaf spring member urges an end of said scanning optical apparatus with respect to said insertion direction of said scanning optical apparatus toward a direction substantially perpendicular to said insertion direction.

* * * * *